United States Patent
Merzougui et al.

(10) Patent No.: US 8,383,293 B2
(45) Date of Patent: Feb. 26, 2013

(54) SUPPORTS FOR FUEL CELL CATALYSTS BASED ON TRANSITION METAL SILICIDES

(75) Inventors: Belabbes Merzougui, Warren, MI (US); Jon C. Halalay, Grosse Pointe, MI (US); John T. Johnson, Sterling Heights, MI (US); Gregory C. Garabedian, Warren, MI (US); Michael P. Balogh, Novi, MI (US); Swathy Swathirajan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1189 days.

(21) Appl. No.: 11/562,712

(22) Filed: Nov. 22, 2006

(65) Prior Publication Data
US 2008/0118818 A1  May 22, 2008

(51) Int. Cl.
*H01M 4/90* (2006.01)

(52) U.S. Cl. ........ 429/532; 429/523; 429/524; 429/525; 429/526; 502/101

(58) Field of Classification Search .................. None
See application file for complete search history.

(56) References Cited

U.S. PATENT DOCUMENTS

| | | | |
|---|---|---|---|
| 3,346,421 A * | 10/1967 | Thompson et al. | ............. 429/42 |
| 4,186,110 A | 1/1980 | Jalan et al. | |
| 4,192,907 A | 3/1980 | Jalan et al. | |
| 4,362,790 A * | 12/1982 | Blanchart et al. | ............. 429/505 |
| 4,422,917 A | 12/1983 | Hayfield | |
| 4,467,050 A | 8/1984 | Patel et al. | |
| 4,677,092 A | 6/1987 | Luczak et al. | |
| 4,868,841 A | 9/1989 | Affleck et al. | |
| 4,992,407 A | 2/1991 | Chakraborty et al. | |
| 5,024,905 A | 6/1991 | Itoh et al. | |
| 5,183,713 A | 2/1993 | Kunz | |
| 5,385,874 A | 1/1995 | Renlund et al. | |
| 5,431,012 A | 7/1995 | Narula et al. | |
| 5,559,065 A | 9/1996 | Lauth et al. | |
| 5,597,771 A | 1/1997 | Hu et al. | |
| 5,680,292 A | 10/1997 | Thompson, Jr. et al. | |
| 5,691,263 A | 11/1997 | Park et al. | |
| 5,705,265 A | 1/1998 | Clough et al. | |
| 5,759,944 A | 6/1998 | Buchanan et al. | |
| 5,766,789 A | 6/1998 | James et al. | |
| 5,861,222 A | 1/1999 | Fischer et al. | |
| 5,879,827 A | 3/1999 | Debe et al. | |
| 5,879,828 A | 3/1999 | Debe et al. | |
| 6,297,185 B1 | 10/2001 | Thompson et al. | |
| 2006/0246344 A1* | 11/2006 | Halalay et al. | ................. 429/44 |
| 2006/0251954 A1* | 11/2006 | Merzougui et al. | ............. 429/44 |

FOREIGN PATENT DOCUMENTS

WO    WO 92/16027    9/1992

* cited by examiner

*Primary Examiner* — Ula C Ruddock
*Assistant Examiner* — Tony Chuo
(74) *Attorney, Agent, or Firm* — Brooks Kushman P.C.

(57) ABSTRACT

An electrocatalyst for fuel cell applications includes a catalyst support and a noble metal or noble metal-based alloy catalyst supported upon the catalyst support. The catalyst support characteristically includes a Group IV-VI transition metal silicide with or without the mixing of carbon. A fuel cell incorporating the electrocatalyst into the anode and/or cathode is disclosed. Such fuel cell exhibit improved cycling and operating performance.

23 Claims, 4 Drawing Sheets

US 8,383,293 B2

SUPPORTS FOR FUEL CELL CATALYSTS BASED ON TRANSITION METAL SILICIDES

BACKGROUND OF THE INVENTION

1. Field of the Invention

In at least one embodiment, the present invention is related to catalyst supports for fuel cells.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, not electronically conductive and gas impermeable. In typical applications, fuel cells are provided in arrays of many individual fuel cell stacks in order to provide high levels of electrical power.

A significant problem hindering the large-scale implementation of fuel cell technology is the loss of performance during extended operation and automotive cycling. A considerable part of the performance loss of PEM fuel cells is associated with the degradation of the electrocatalyst, probably caused by Pt particle growth, Pt dissolution and carbon corrosion. Carbon has been found to corrode at potentials above 1.2 V and the addition of Pt onto the surface of the carbon increases the corrosion rate considerably at potentials below 1.2 V. These processes lead to a loss in active surface area of the Pt catalyst that leads to loss in oxygen electrode performance. However, cycling experiments reveal that the loss of hydrogen adsorption area alone does not explain the loss in oxygen performance. Additional factors include interference from absorbed OH species, and a possible change in the porosity of the support material affecting voltage loss for oxygen reduction. Therefore, the specific interaction of Pt with the catalyst support can have a significant influence on the stability of performance of the Pt electrocatalyst.

Accordingly, there exists a need for a replacement material for the carbon support to stabilize the oxygen reduction performance of the catalyst.

SUMMARY OF THE INVENTION

The present invention overcomes the problems encountered in the prior art by providing in at least one embodiment, an electrocatalyst for use in a fuel cell is provided. The electrocatalyst of this embodiment comprises a catalyst support and a noble metal or noble metal-based alloy catalyst supported upon the catalyst support. The catalyst support characteristically includes a Group IV-VI transition metal silicide. Advantageously, the oxygen reduction performance of the electrocatalysts of the invention is stabilized during load cycling and stop-start cycling of fuel cells for automotive applications. Accordingly, since carbon corrosion is a major factor that limits the useful life of a fuel cell cathode and anode, the replacement of at least a portion of the carbon support with a metal silicide support such as $TiSi_2$, $TaSi_2$, $WSi_2$, improves the life of fuel cell cathodes.

In another embodiment, a fuel cell incorporating the electrocatalysts of the invention is provided. In the present embodiment, the electrocatalysts set forth above are incorporated into the anode and/or cathode layers of a fuel cell.

DETAILED DESCRIPTION OF THE PREFERRED EMBODIMENT(S)

Figure 1:
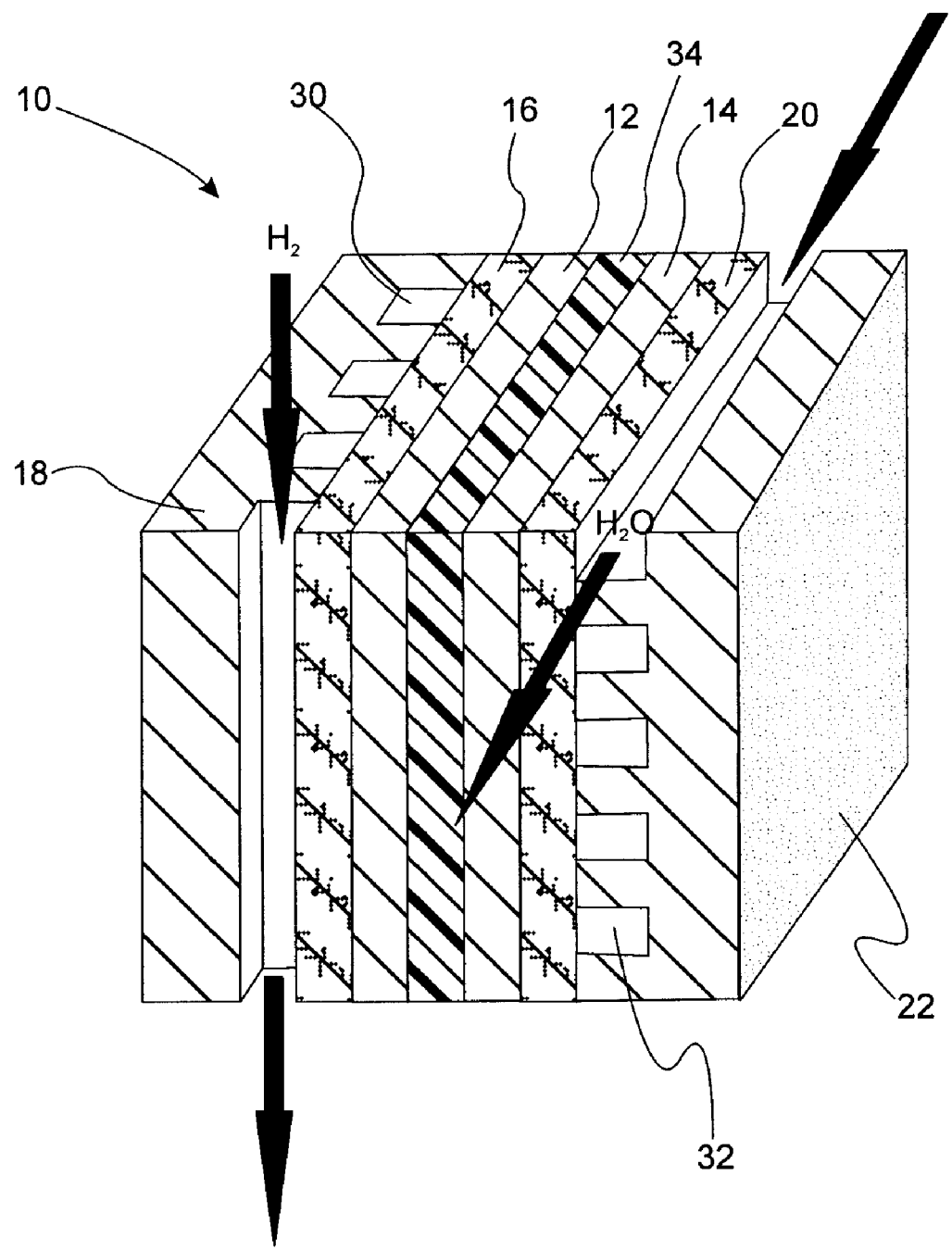
FIG. 1 is a perspective view of a fuel cell incorporating the electrocatalyst of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention, and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "electrocatalyst" as used herein means the combination of a catalyst and a support.

In one embodiment of the present invention, an electrocatalyst for use in a fuel cell in provided. The electrocatalyst of this embodiment comprises a catalyst support and a noble metal or noble metal-based alloy catalyst supported upon the catalyst support. The catalyst support characteristically includes a Group IV-VI transition metal silicide. A number of metal silicides (e.g. $TiSi_2$, $TaSi_2$, $WSi_2$) exhibit both electrical conductivities akin to metals (i.e. resistivity in the range 10 to 100 micro-ohm-cm) and outstanding chemical oxidation and corrosion resistance. The unique properties of such materials, especially as nanosized particles, lead to enhanced catalytic behavior as well as increased durability of the fuel cell electrodes.

With reference to FIG. 1, a perspective view of a fuel cell incorporating the electrocatalyst of the present embodiment is provided. PEM fuel cell 10 includes anode catalyst layer 12 and cathode catalyst layer 14, one or both of which include the electrocatalysts of the present embodiment. Anode diffusion layer 16 is positioned between anode flow field 18 and anode catalyst layer 12 while cathode diffusion layer 20 is positioned between cathode flow field 22 and cathode catalyst layer 14. Anode gas flow field 18 typically includes one or more channels 30 for introducing a first gas to the fuel cell 10. Cathode gas flow field 22 includes one or more channels 32 for introducing a second gas into fuel cell 10. Typically, the first gas includes a fuel such as hydrogen while the second gas includes an oxidant such as oxygen. Polymeric ion conductive membrane 34 is interposed between anode catalyst layer 12 and cathode catalyst layer 14.

In one variation of the present embodiment, the noble metal or noble metal-based alloy catalyst includes a noble metal selected from the group consisting of Pt, Pd, Os, Ir, Ru, Ag, Rh, and alloys thereof, and combinations thereof. In a further refinement, the noble metal or noble metal-based alloy catalyst further includes non-noble alloy constituents. Suitable examples of such non-noble alloy constituents include components selected from Co, Ni, Ti, Zr, Cr, V, Nb, Ta, W, Fe and combinations thereof.

As set forth above, the catalyst support includes a Group IV-VI transition metal silicide. In a variation, the metal silicide comprises a metal selected from the group consisting of titanium, zirconium, tungsten and combinations thereof. In a particularly useful variation, the metal silicide includes titanium silicide. Specific examples of useful titanium silicides include, but are not limited to, $TiSi_2$, $TiSi$, $Ti_5Si_3$, $TiSi_5$, and combinations thereof.

In some variations of the present embodiment, the Group IV-VI transition metal support is characterized by the molar ratio of transition metal to silicon and by the weight percentage of the noble metal. In one such variation, the molar ratio of transition metal to silicon is from 0.01 to 99. In another variation, the molar ratio of transition metal to silicon in the Group IV-VI transition metal support is from 0.2 to 0.6. In still other variations, the amount of noble metal is from 0.5 wt % to 60 wt % of the combined weight of the noble metal based catalyst and the Group 4-6 transition metal-based support. In still another variation, the amount of noble metal loading is from 10 to 40 wt. % for cathode applications. In still another variation, the amount of noble metal loading is from 0.5-20 wt. % for anode applications.

In another variation of the present embodiment, the catalyst support further comprises a Group 4-6 transition metal oxide. In one refinement of this variation, the Group 4-6 transition metal oxide is present in an amount from 0.005% to 50 wt. % of the total weight of the catalyst support. When present, the Group 4-6 transition metal oxide may be characterized by the electrical resistivity and by the surface area. In one variation, the electrical resistivity is from 0.01 to 10 ohm-cm. electrocatalyst of claim 1 wherein the Group 4-6 transition metal oxide has a surface area from 5 $m^2/g$ to 600 $m^2/g$.

As set forth above, embodiments of the electrocatalyst of the present invention include a non-carbon catalyst support (i.e., the catalyst support characteristically includes a Group IV-VI transition metal silicide). In at least some applications, the electrocatalyst of the present embodiment further includes carbon as a support. In such circumstances, the catalyst and the Group 4-6 transition metal silicide is dispersed throughout the carbon to form a combined catalyst silicide-carbon composition. As set forth above, the electrocatalyst also includes a noble metal or noble metal-based alloy supported upon the non-carbon catalyst support In a refinement of such silicide-carbon compositions, the Group 4-6 transition metal silicide is from 15% to 50 wt % of the total weight of the combined catalyst silicide-carbon composition.

The following examples illustrate the various embodiments of the present invention. Those skilled in the art will recognize many variations that are within the spirit of the present invention and scope of the claims.

Platinization Procedure: One gram of silicide is added to 300 ml of water, which is already heated to 60-70° C. in a 600 ml beaker using a multi-position hotplate stirrer (Pyro Multi-Magnestir, Lab-Line Corporation). In order to suspend the silicide, the mixture is sonicated for 20 minutes using a Bronson Sonifier 450 with a ¾ solid horn and flat microtip with pulsed dispersion at 20% power rating. About 1.2 grams of diamine II platinum nitrite (J&J Materials, Inc.) is added to 100 ml of water, which is already heated to 60-70° C. in a 250 ml beaker. Stirring and heating continues until the platinum compound is dissolved. The suspended silicide sample in water is transferred to a 1000 ml reaction vessel along with a Teflon stir bar and allowed to heat with continued stirring. Two Pyrex gas diffusion tubes with fritted end disk (250 mm length, 12 mm disk diameter, 8 mm stem diameter) are inserted into the reaction vessel and positioned opposite one another along the inner sidewall of the vessel. The platinum solution is added to the reaction vessel, and pH and temperature were monitored by using an Orion 3700 advanced PerpHecT Log R pH/ISE monitor (Thermo Electron Corporation). The pH of the reaction vessel was adjusted to 3.0 with the dropwise addition of glacial acetic acid (Reagent A.C.S. grade, Fisher Scientific). Carbon Monoxide, 100% (Spectra Gases, Inc.) is delivered through a three-port, Airless-Ware, glass, gas manifold, Kontes Corp., to the diffusion tubes at 2 liters per minute. The CO is allowed to diffuse for approximately 10 min before the start of the reaction while the temperature is rising from 75-80° C. with continued stirring. When the temperature reaches 80° C., 0.4 gm hydrazine hydrate (Sigma-Aldrich Inc.) in 5 ml water is added in 1 ml aliquots to the reaction vessel. The pH is monitored and adjusted to 3.0 using acetic acid and temperature is monitored and maintained at 80° C. over the next one hour. Any liquid volume that is lost from evaporation is replaced over the 1 hr reaction by squirting down the vessel sidewalls, and reincorporating the silicide with distilled water. After 1 hr the reaction vessel is removed from the heat, and continually stirred until the reaction vessel contents reaches room temperature. The reaction product is filtered through a 100 ml analytical vacuum filter funnel with 0.45 μm, cellulose nitrate membrane (Nalgene), and washed with five 100 ml aliquots of distilled water. The reaction product is recovered from the filter and placed in a glass petri dish. The reaction product is allowed to dry overnight in a precision vacuum oven at 50° C. (CGA Corp.) The final product was weighted then ground in a mortar and pestle and distributed for chemical characterization Electrochemical corrosion tests in a simulated fuel cell environment (0.5M $H_2SO_4$ aqueous solution at 95° C.) are performed on several of these materials (bare substrates: $WSi_2$, $TaSi_2$, $TiSi_2$, $ZrSi_2$; platinized substrates: Pt/$WSi_2$, Pt/$TiSi_2$). The oxygen reduction activity and hydrogen adsorption area of electrodes made with platinum deposited on $TiSi_2$ are measured over 1000 electrochemical cycles in the potential range 0 to 1.2 V/RHE at a scan rate of 20 mV/s.

Electrochemical dissolution rates at 1.2 V/RHE and 1.4 V/RHE in de-aerated 0.5M $H_2SO_4$ at 95° C., for $WSi_2$, $TiSi_2$, $ZrSi_2$, as well as Vulcan XC-72 carbon are listed in Table 1. Except $WSi_2$, all the other materials suffer mass losses due to anodic oxidation. Whereas the mass loss increases considerably at 1.4 V for Vulcan XC-72 carbon, mass changes are more stable for the silicides at the higher potential. This behavior of silicides may indicate formation of passive oxide films on these materials at positive potentials.

TABLE 1

Electrochemical corrosion rates

| | Material | | | | |
|---|---|---|---|---|---|
| | Vulcan XC-72 | $TaSi_2$ | $WSi_2$ | $TiSi_2$ | $ZrSi_2$ |
| Corrosion Rate at E = 1.2 V, μmole m$^{-2}$ hr$^{-1}$ | −2 | −3.7 | 1.0 | −37 | −110 |
| Corrosion Rate at E = 1.4 V, μmole m$^{-2}$ hr$^{-1}$ | −24 | −3.4 | 4.7 | −26 | N/A |

Table 2 provides electrochemical corrosion rates in de-aerated 0.5M $H_2SO_4$ at 95° C. for platinized Vulcan XC-72 carbon, platinized tungsten disilicide and platinized titanium disilicide. Platinum is deposited on both $WSi_2$ and $TiSi_2$ in respective amounts of 32 weight % and 35 weight % by weight as set forth above. As illustrated by Table 2, it should be appreciated that although the corrosion of the carbon support leads to mass loss through $CO_2$ evolution, corrosion of $WSi_2$ leads to mass gain due to the formation of solid oxides. Furthermore, note that platinization reduces the dissolution rates for $TiSi_2$ by a factor of 4 to 5. Athough this benefit from platinization may not obtain for high surface area substrate materials, the present result indicates that substrate sites covered by platinum particles are, to a greater or lesser degree, protected from corrosion.

TABLE 2

Electrochemical corrosion rates for platinized support materials.

| Material | Tanaka Pt on Vulcan XC-72 | Pt/$WSi_2$ | Pt/$TiSi_2$ |
|---|---|---|---|
| Corrosion Rate at E = 1.2 V, μmole m$^{-2}$ hr$^{-1}$ | −4.8 | 9.4 | −7.5 |
| Corrosion Rate at E = 1.4 V, μmole m$^{-2}$ hr$^{-1}$ | −38 | 9.7 | −7.2 |

Figure 2:
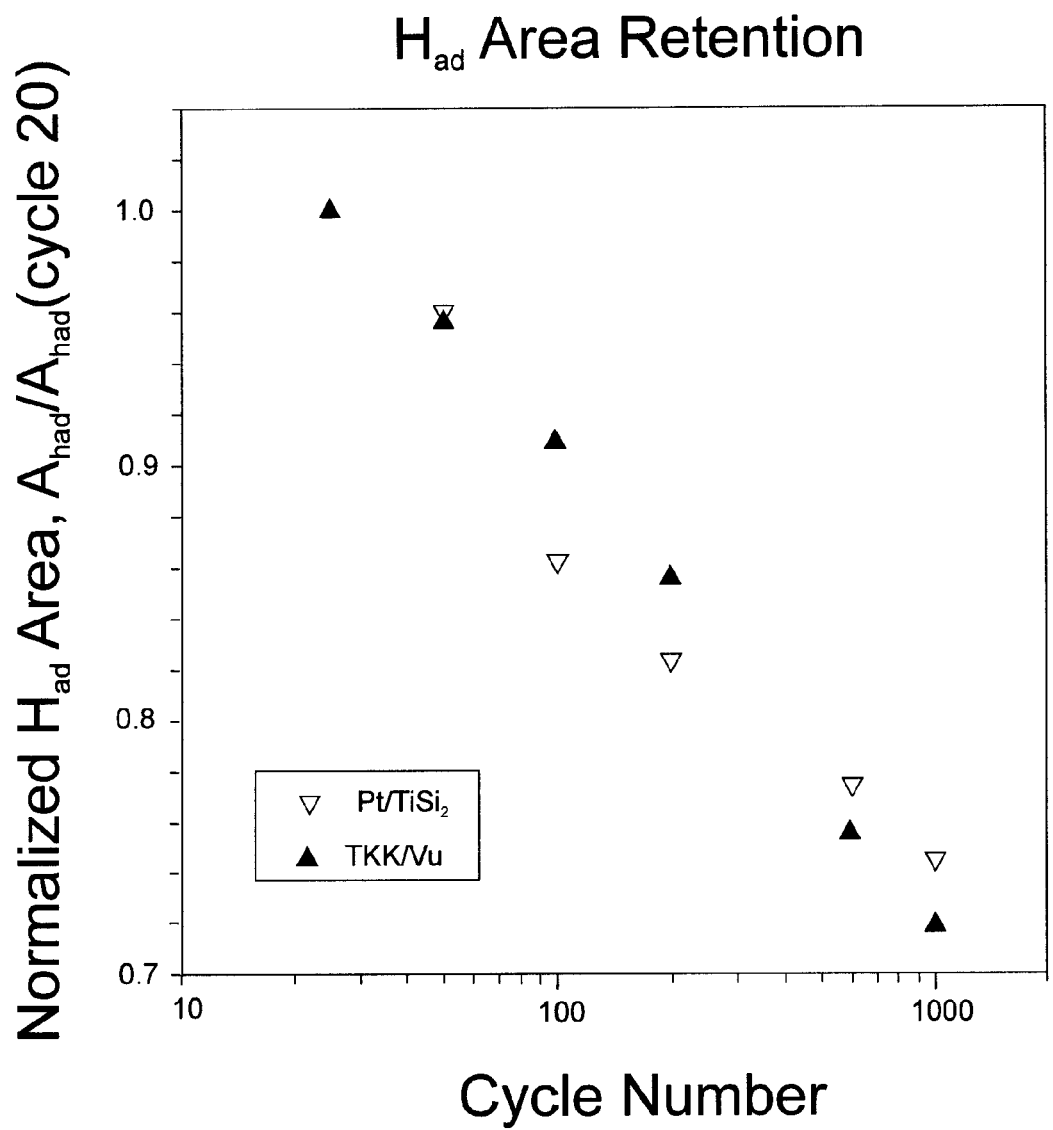
FIG. 2 provides a plot of hydrogen adsorption area retention on cycling for Tanaka TKK platinum catalyst deposited on Vulcan XC-72 carbon and platinum deposited on titanium disilicide support. Cycling conditions: 0.1M $HClO_4$ solution, $O_2$ atmosphere, T=25° C., 400 RPM, 20 mV/s, $0 \leq E \leq 1.2$ V/RHE ("reversible hydrogen electrode")
Figure 3:
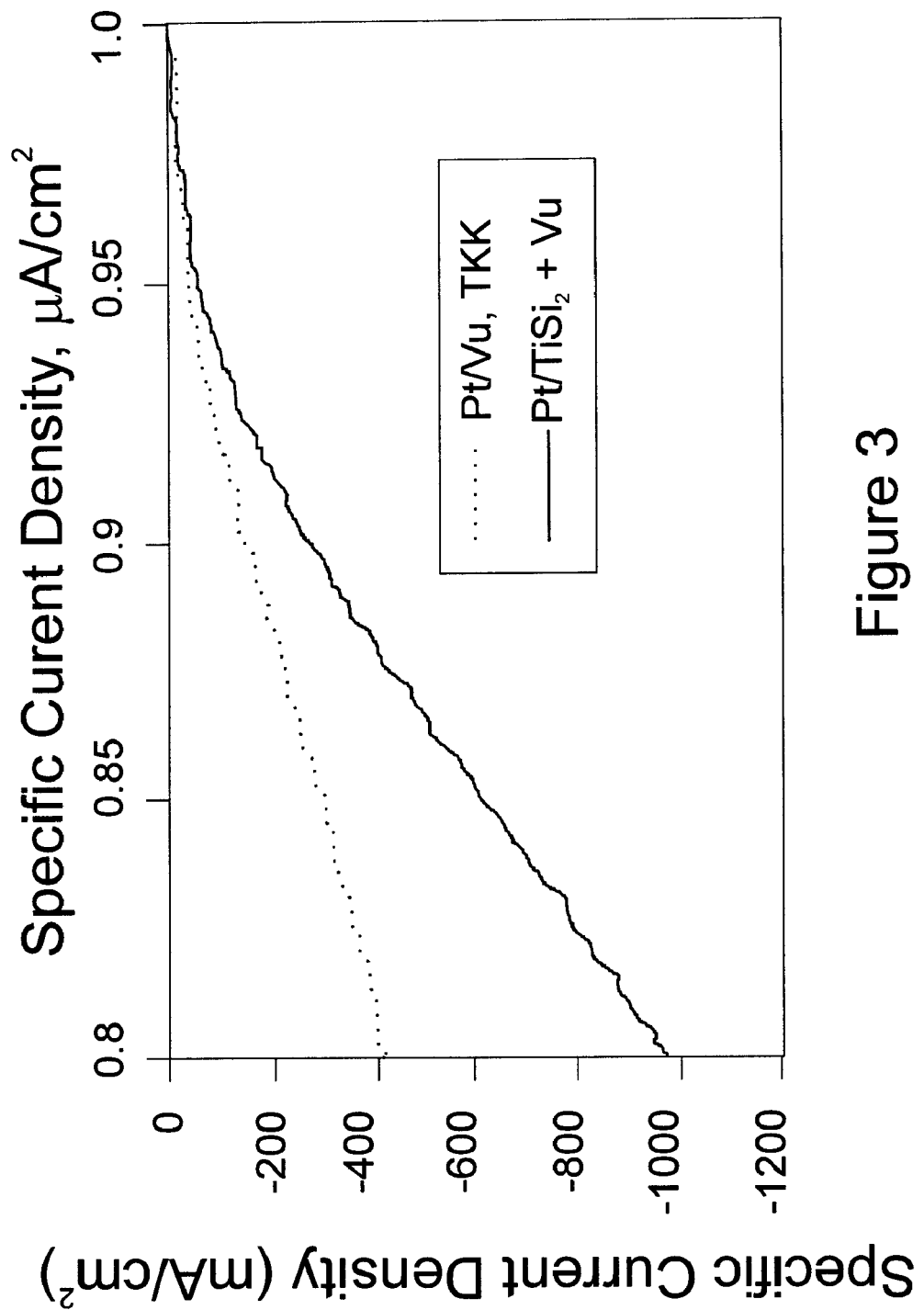
FIG. 3 provides plots of the specific current density ($\mu A/cm^2 Pt$) versus potential (relative to a reversible hydrogen electrode "RHE") for Tanaka TKK platinum deposited on Vulcan XC-72 carbon and for platinum deposited on titanium disilicide and then mixed with carbon.
Figure 4:
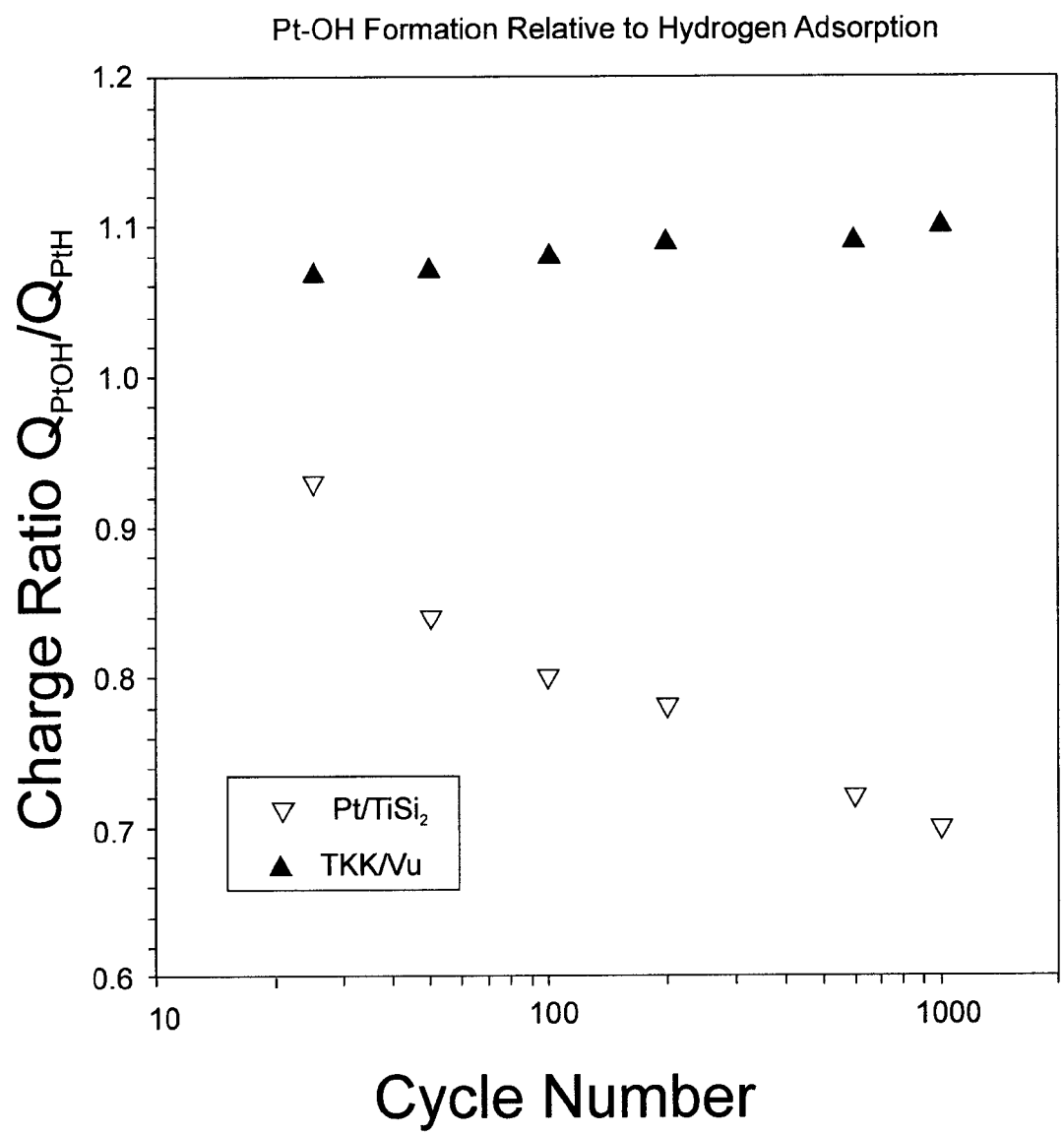
FIG. 4 provides plots of charge ratio ($Q_{PtOH}/Q_{PtH}$) as a function of cycle number for Tanaka TKK platinum catalyst deposited on Vulcan XC-72 carbon and platinum deposited on titanium disilicide support.

The formation of metal oxides can have a beneficial effect on the performance of the fuel cell, by stabilizing the platinum particles through an interaction between the oxide and the d-orbital of Pt, which can result in improved oxygen reduction kinetics. Performance stability during potential cycling has been evaluated using the thin film rotating disk electrode method. FIG. 2 provides plots of hydrogen adsorption area retention on cycling for Tanaka TKK platinum catalyst deposited on Vulcan XC-72 carbon and platinum deposited on titanium disilicide support. The cycling conditions are: 0.1 M $HClO_4$ solution, $O_2$ atmosphere, T=25° C., 400 RPM, 20 mV/s, 0<E<1.2 V/RHE). The hydrogen adsorption area retention is observed to be similar for both platinized $TiSi_2$ and Tanaka platinum deposited on Vulcan XC-72 carbon. However, a support including $TiSi_2$ shows better catalyst performance, as evident from FIGS. 3 and 4. FIG. 3 provides plots of the specific current density (μA/cm$^2_{Pt}$) versus potential (relative to a reversible hydrogen electrode "RHE") for Tanaka TKK platinum deposited on Vulcan XC-72 carbon, and for platinum deposited on titanium disilicide and then mixed with carbon. The conditions for FIG. 3 are: 0.1M $HClO_4$ solution, $O_2$ atmosphere, T=25° C., 1600 rpm, 10 mV/s scan rate, 0<E<1.2 V/RHE). FIG. 4 provides plots of charge ratio ($Q_{PtOH}/Q_{PtH}$) as a function of cycle number for Tanaka TKK platinum catalyst deposited on Vulcan XC-72 carbon and platinum deposited on titanium disilicide support. The consistently high magnitude for titanium disilicide of the current density for all potentials measured is indicative of superior fuel cell performance over this range with a high output power being obtainable. FIG. 4 provides plots of charge ratio ($Q_{PtOH}/Q_{PtH}$) as a function of cycle number for Tanaka TKK platinum catalyst deposited on Vulcan XC-72 carbon and platinum deposited on titanium disilicide support. The Cycling conditions: 0.1M $HClO_4$ solution, $O_2$ atmosphere, T=25° C., 400 RPM, 20 mV/s, 0≦E≦1.2 V/RHE). It is clear that the charge ratio, $Q_{Pt-OH}/Q_{Pt-H}$, for Pt/$TiSi_2$ decreases with cycling while it increased for Pt/Vu. The increase in PtOH charge observed for Pt/Vu may be due to place-exchange reactions that may occur during repeated formation and reduction of PtOH during cycling. On the other hand, the decrease in the amount of PtOH formed for platinized silicide may indicate a reduction in place-exchange reactions for the Pt catalyst deposited on this support. Thus a reduction in PtOH formation may be caused by atom migration processes that are likely to occur during cycling, e.g., migration of Pt in to the silicide lattice leading to reduced OH formation on Pt.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An electrocatalyst for use in a fuel cell comprising:
a catalyst support, the catalyst support including a Group IV-VI transition metal silicide;
carbon; and
a noble metal or noble metal-based alloy catalyst supported upon the catalyst support, wherein the Group IV-VI transition metal silicide is dispersed throughout the carbon to form a combined catalyst silicide-carbon composition and the Group 4-6 transition metal silicide is from 15% to 50 wt % of the total weight of the combined catalyzed silicide-carbon composition.

2. The electrocatalyst of claim 1 wherein the noble metal is selected from the group consisting of Pt, Pd, Os, Ir, Ru, Ag, Rh, and alloys thereof, and combinations thereof, and non-noble alloy constituents selected from Co, Ni, Ti, Zr, Cr, V, Nb, Ta, W, Fe and combinations thereof.

3. The electrocatalyst of claim 1 wherein the metal silicide comprises a metal selected from the group consisting of titanium, zirconium, tungsten and combinations thereof.

4. The electrocatalyst of claim 1 wherein the metal silicide comprises titanium silicide.

5. The electrocatalyst of claim 4 wherein the titanium silicide comprises a silicide selected from the group consisting of $TiSi_2$, $TiSi$, $Ti_5Si_3$, $TiSi_5$, and combinations thereof.

6. The electrocatalyst of claim 1 wherein the molar ratio of transition metal to silicon in the Group IV-VI transition metal support is from 0.01 to 99.

7. The electrocatalyst of claim 1 wherein the molar ratio of transition metal to silicon in the Group IV-VI transition metal support is from 0.2 to 0.6.

8. The electrocatalyst of claim 1 wherein the amount of noble metal is from 0.5 wt % to 60 wt % of the combined weight of the noble metal-based catalyst and the Group 4-6 transition metal based support.

9. The electrocatalyst of claim 1 wherein the catalyst support further comprises a Group 4-6 transition metal oxide.

10. The electrocatalyst of claim 9 wherein the Group 4-6 transition metal oxide is present in an amount 0.005% to 50 wt. %.

11. The electrocatalyst of claim 9 wherein the Group 4-6 transition metal oxide has an electrical resistivity from 0.01-10 ohm-cm.

12. The electrocatalyst of claim 9 wherein the Group 4-6 transition metal oxide has a surface area from 5-600 $m^2/g$.

13. A fuel cell having one or more electrodes comprising the electrocatalyst of claim 1.

14. An electrocatalyst for use in a fuel cell, the electrocatalyst comprising:
a non-carbon catalyst support comprising a transition metal silicide;
a noble metal or noble metal-based alloy supported upon the non-carbon catalyst support; and
carbon mixed with the noble metal or noble metal-based alloy supported upon the non-carbon catalyst support to form a combined catalyst silicide-carbon composition.

15. The electrocatalyst of claim 14 wherein the noble metal is selected from the group consisting of Pt, Pd, Os, Ir, Ru, Ag, Rh, and alloys thereof, and combinations thereof, and non-noble alloy constituents selected from Co, Ni, Ti, Zr, Cr, V, Nb, Ta, W, Fe and combinations thereof.

16. The electrocatalyst of claim 14 wherein the transition metal silicide comprises a transition metal selected from Groups 4 through 6 of the Periodic Table.

17. The electrocatalyst of claim 14 wherein the transition metal silicide comprises a metal selected from the group consisting of titanium, zirconium, tungsten, tantalum, and combinations thereof.

18. The electrocatalyst of claim 14 wherein the transition metal silicide comprises titanium silicide.

19. The electrocatalyst of claim 18 wherein the titanium silicide comprises a silicide selected from the group consisting of $TiSi_2$, $TiSi$, $TiSi_5$, and combinations thereof.

20. The electrocatalyst of claim 14 wherein the transition metal silicide is from 15% to 50 wt % of the total weight of the combined silicide-carbon composition.

21. The electrocatalyst of claim 14 wherein the catalyst support further comprises a transition metal oxide.

22. A fuel cell having one or more electrodes comprising the electrocatalyst of claim 14.

23. An electrocatalyst for use in a fuel cell, the catalyst comprising:
a catalyst support comprising a titanium silicide;
carbon; and
a noble metal or noble metal-based alloy supported upon the catalyst support wherein the titanium silicide is dispersed throughout the carbon to form a combined catalyst silicide-carbon composition and the Group 4-6 transition metal silicide is from 15% to 50 wt % of the total weight of the combined catalyzed silicide-carbon composition.

* * * * *